United States Patent Office 3,154,579
Patented Oct. 27, 1964

3,154,579
BIS(POLYHALOTETRAHYDRO-4,7-METH-
ANOINDEN-1-YL)-AMINES
John F. Flanagan, Chicago, Ill., assignor to Velsicol
Chemical Corporation, Chicago, Ill., a corporation of
Illinois
No Drawing. Filed Apr. 24, 1961, Ser. No. 104,829
6 Claims. (Cl. 260—563)

This invention relates to new chemical compositions of matter. More specifically, this invention relates to new chemical compounds of the formula:

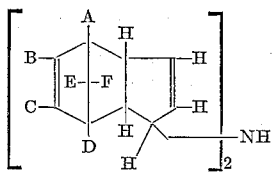

wherein A, B, C, D, E and F are selected from the group consisting of hydrogen, chlorine and bromine atoms, provided that at least one of said A, B, C, D, E and F is selected from the group consisting of chlorine and bromine atoms. These new compounds are useful as pesticides, especially as fungicides and nematocides.

The new compounds of the present invention can be prepared readily by the ammoniation of an appropriate brominated and/or chlorinated 1-halo-3a,4,7,7a-tetrahydro-4,7-methanoindene, hereinafter referred to as the 1-halotetrahydromethanoindene starting material. This ammoniation reaction can be performed by bubbling ammonia gas through a solution of the 1-halotetrahydromethanoindene starting material in a relatively inert solvent, such as acetone, the lower alkanols, or the lower alkyl ethers. The ammoniation can be carried out satisfactorily at room temperature, although higher and lower temperatures can be successfully used by adjusting the reaction time. Generally the ammoniation is complete within 15 hours.

The compounds of the present invention can be recovered from this reaction mixture by means common to the art, as for example, by dilution of the reaction mixture with water, extraction of the desired product therefrom with solvent, neutralization of the unreacted ammonia with a dilute aqueous solution of a mineral acid, such as hydrochloric acid, filtration of the resulting precipitate from the acidic aqueous supernatant liquid, agitation of the precipitate with dilute base to convert the amine salt to the free amine, extraction of the free amine from the aqueous solution with a suitable solvent, and evaporation of the solvent to recover the crude amine product. This crude amine product is often sufficiently pure for pesticidal use without further purification. If desired however, the crude product can be purified by recrystallization from a suitable solvent, such as hexane.

Although the 1-halotetrahydromethanoindene starting materials can have any of the various halogen substituents in the 1-position, and although the use of such materials is within the scope of this invention, it is preferred to utilize the 1-bromo- and 1-chlorotetrahydromethanoindene starting materials due to their greater availability and relatively easier preparation. As an illustration of the preparation of the 1-halotetrahydromethanoindene starting materials, the 1-bromotetrahydromethanoindene starting materials can be obtained by the bromination of an appropriate halogenated 3a,4,7,7a-tetrahydro-4,7-methanoindene, which can be prepared, for example, by Diels-Alder adduction of cyclopentadiene and a suitable halogenated cyclopentadiene. Examples of suitable halogenated cyclopentadienes include:

5-chlorocyclopentadiene,
5,5-dichlorocyclopentadiene,
2,3-dichlorocyclopentadiene,
2,3,4-trichlorocyclopentadiene,
1,2,3,4-tetrachlorocyclopentadiene,
1,2,3,4,5-pentachlorocyclopentadiene,
1,2,3,4,5,5-hexachlorocyclopentadiene,
5-bromocyclopentadiene,
5,5-dibromocyclopentadiene,
2,3-dibromocyclopentadiene,
2,3,4-tribromocyclopentadiene,
1,2,3,4-tetrabromocyclopentadiene,
1,2,3,4,5-pentabromocyclopentadiene,
1,2,3,4,5,5-hexabromocyclopentadiene, etc.

In addition it is also contemplated within the scope of this invention that the halogenated cyclopentadienes may contain more than one species of halogen substituents such as, for example, 1-chloro-2-bromocyclopentadiene,
1,2-dichloro-3-bromocyclopentadiene,
1,2-dichloro-5,5-dibromocyclopentadiene,
pentabromomonochlorocyclopentadiene, etc.

However, it is preferred to utilize a cyclopentadiene containing from four to six chlorine atoms as the appropriate halogenated cyclopentadiene, due to its greater availability and relatively lower cost.

The bromination of the appropriate halogenated 3a,4,7,7a-tetrahydro-4,7-methanoindene is preferably carried out in the presence of a small quantity (about 0.001 to 0.01 mole per mole of halogenated 3a,4,7,7a-tetrahydro-4,7-methanoindene) of an organic peroxide such as benzoyl peroxide, lauryl peroxide, or ascaridol. One mole of bromine or preferably a slight excess should be used for each mole of adduct. The bromine is added in small quantities at regular intervals to a solution of the adduct in an inert solvent. Suitable inert solvents include carbon tetrachloride, chloroform, carbon disulfide, tetrachloroethylene, and the like. Suitable reaction temperatures are from about normal room temperature to about 120° C. After all the bromine has been added, the product can be isolated by distilling off the solvent and any excess bromine in vacuo. While the 1-bromotetrahydromethanoindene starting material obtained in this manner is often sufficiently pure to be used directly as the starting material for the ammoniation, it can be purified, for example, by recrystallization from a suitable solvent, such as hexane or pentane.

The manner in which the new compounds of this invention can be prepared is illustrated in the following examples. It is understood that although specific halogenated 3a,4,7,7a - tetrahydro - 4,7 - methanoindenes are specified in the examples for the purpose of illustration, other halogenated tetrahydromethanoindenes within the scope of this invention may be substituted therefor.

EXAMPLE 1

*Preparation of 1-Bromo-4,5,6,7,8,8-Hexachloro-3a,4,7,7a-Tetrahydro-4,7-Methanoindene*

4,5,6,7,8,8 - hexachloro - 3a,4,7,7a - tetrahydro - 4,7-methanoindene (33.89 g.; 0.1 mole), 0.1 g. benzoyl peroxide, and 50 ml. carbon tetrachloride were placed in a 150 ml., three-necked, round-bottomed flask fitted with a heating mantle, mechanical stirrer, internal thermometer, reflux condenser, and a tared 10-ml. burette. Bromine (16.08 g.; 0.100 mole) was weighed into the burette. This mixture in the flask was stirred and heated to a temperature of 70–72° C., whereupon the heat was reduced and bromine was added over a period of 30 minutes at a rate of about 0.2 ml. per minute at a temperature of 68–72° C. The mixture was stirred for an additional 10 minutes at 70° C. and transferred to a 500-ml. round-bottomed flask. The solvent was distilled off in vacuo to leave a residual oil, which was dissolved in 50 ml. hexane. The solvent was again distilled off in vacuo to leave an oil, which was dissolved while still warm in 50 ml. pentane. The pentane mixture was swirled under a vacuum without heating, under which conditions the product separated in micro crystals. The white powder was dried thoroughly in a vacuum oven to give 42 g., the theoretical yield of 1-bromo-4,5,6,7,8,8-hexachloro-3a,4,7a-tetrahydro-4,7-methanoindene, melting point 64–66° C.

EXAMPLE 2

*Preparation of Bis-(4,5,6,7,8,8-Hexachloro-3a,4,7,7a-Tetrahydro-4,7-Methanoinden-1-yl)-Amine*

1 - bromo - 4,5,6,7,8,8 - hexachloro - 3a,4,7,7a - tetrahydro-4,7-methanoindene (160 g.; 0.38 mole) prepared by the method of Example 1, was dissolved in absolute ethanol (500 ml.) by heating the ethanol to boiling, and the solution charged to a 1 liter, three-neck, round-bottom flask fitted with a mechanical stirrer, gas inlet tube extending below the surface of the liquid, and a gas escape tube extending from above the surface of the liquid, permitting free flow of gas. An ammonia gas tank was piped to the gas inlet tube. Ammonia gas was bubbled into the reaction solution with stirring for a period of 7 hours at room temperature. The total reaction mixture was mixed with water (1 liter) and the reaction product extracted therefrom with hexane (three 500 ml. portions). The hexane extracts were combined and acidified with 2% aqueous hydrochloric acid solution, resulting in precipitation of a heavy, fluocculent, water and hexane-insoluble precipitate, which was isolated by filtration. The isolated precipitate was shaken with 10% aqueous sodium hydroxide solution and extracted therefrom with diethyl ether. The ethereal solution was dried over anhydrous magnesium sulfate and the ether evaporated on a steam bath to recover the crude product, which was recrystallized from hexane and then from ethanol to yield solid crystals of bis-(4,5,6,7,8,8-hexachloro - 3a,4,7,7a - tetrahydro - 4,7 - methanoinden - 1-yl)-amine, melting point 168–170° C. The product had the following elemental analysis as calculated for $C_{20}H_{11}Cl_{12}N$:

|  | C | H | Cl | N |
| --- | --- | --- | --- | --- |
| Theoretical, percent | 34.77 | 1.61 | 61.59 | 2.03 |
| Found, percent | 34.63 | 1.53 | 61.00 | 2.17 |

EXAMPLE 3

*Preparation of Bis-(4,5,6,7,8-Pentachloro-3a,4,7,7a-Tetrahydro-4,7-Methanoinden-1-yl)-Amine*

1 - bromo - 4,5,6,7,8 - pentachloro - 3a,4,7,7a - tetrahydro-4,7-methanoindene (192 g.; 0.5 mole), prepared by the bromination of the Diels-Alder adduct of 1,2,3,4,5-pentachlorocyclopentadiene and cyclopentadiene, for example, by the bromination procedure described in Example 1, is dissolved in absolute ethanol (500 ml.) by heating the ethanol to boiling. Ammonia gas is bubbled through the solution with stirring for a period of 8 hours at room temperature. The crude product is recovered from the reaction mixture by the procedure described in Example 2 and is recrystallized from hexane to yield bis - (4,5,6,7,8 - pentachloro - 3a,4,7,7a - tetrahydro-4,7-methanoinden-1-yl)amine.

EXAMPLE 4

*Preparation of Bis-(4,5,6,7,8,8-Hexabromo-3a,4,7,7a-Tetrahydro-4,7-Methanoinden-1-yl)-Amine*

1,4,5,6,7,8,8 - heptabromo - 3a,4,7,7a - tetrahydro - 4,7-methanoindene (171 g.; 0.25 mole), prepared by the bromination of the Diels-Alder adduct of 1,2,3,4,5,5-hexabromocyclopentadiene and cyclopentadiene, for example, by the bromination procedure described in Example 1, is reacted with ammonia as described in the previous example. Crude bis-(4,5,6,7,8,8-hexabromo-3a,4,7,7a-tetrahydro-4,7-methanoinden-1-yl)amine is recovered from the reaction mixture by the procedure of Example 2 and is purified by recrystallization from hexane.

EXAMPLE 5

*Preparation of Bis-(4,5,6,7-Tetrachloro-3a,4,7,7a-Tetrahydro-4,7-Methanoinden-1-yl)-Amine*

4,5,6,7 - tetrachloro - 3a,4,7,7a - tetrahydro - 4,7-methanoindene (prepared, for example, by the adduction of 1,2,3,4-tetrachlorocyclopentadiene and cyclopentadiene) is brominated by the method of Example 1 to yield 1 - bromo - 4,5,6,7 - tetrachloro - 3a,4,7,7a- tetrahydro-methanoindene, which is reacted with ammonia gas by the method of Example 2 to yield bis(4,5,6,7-tetrachloro-3a,4,7,7a-tetrahydro-4,7-methanoinden-1-yl)-amine.

EXAMPLE 6

*Preparation of Bis-(4,5,6,7-Tetrabromo-3a,4,7,7a-Tetrahydro-4,7-Methanoinden-1-yl)-Amine*

1,4,5,6,7 - pentabromo - 3a,4,7,7a - tetrahydro - 4,7-methanoindene (prepared, for example, by the bromination of the adduct of 1,2,3,4-tetrabromocyclopentadiene and cyclopentadiene by the method of Example 1) is reacted with ammonia gas by the method of Example 2 to yield bis - (4,5,6,7 - tetrabromo - 3a,4,7,7a - tetrahydro-4,7-methanoinden-1-yl)-amine.

EXAMPLE 7

*Preparation of a Bis-(Pentabromonochloro-3a,4,7,7a-Tetrahydro-4,7-Methanoinden-1-yl)-Amine*

Pentabromomonochloro - 3a,4,7,7a - tetrahydro - 4,7-methanoindene, prepared as described in United States Patent 2,609,910, is brominated by the procedure of Example 1. The product therefrom is reacted with ammonia by the method of Example 2 to yield a compound of the formula:

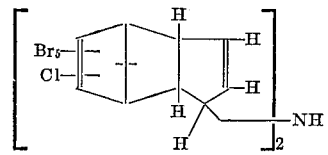

The utility of the compounds of this invention was illustrated, for example, by experiment carried out for the control of soil nematodes. Acetone solutions of the test compounds were dispersed in water to an acetone content of less than 4% by volume. Portions (each portion 4.5 ml.) of the dispersion were charged to 20 x 75 mm. vials. From 150 to 200 nematodes (*Panagrellus redivivus*), 0.5 ml. by volume, were then introduced into the test solutions. Test vials for one compound only with an additional vial with water and nematodes only were placed in an individual water-sealed moisture chamber. Vapor phase toxicity was determined by mortality induced in the water-nematode vial. Contact toxicity was determined by mortality induced in the test compound vials per se. In these experiments, the product of Example 2 used at a concentration of 100 p.p.m. gave 100% mortality of the nematodes both by direct contact and vapor phase exposure.

The utility of the compounds of this invention was further illustrated by experiments carried out for the control of fungi. The fungicidal toxicity of the compounds to spores were determined by the slide germination technique adopted by the Committee on Standardization of Fungicidal Tests of the American Phytopathological Society. Measured concentrations of spores were placed on glass slides in contact with various concentrations of the compounds being tested. The percentage germination of spores was then determined for each treatment after 20 hours' incubation at 72° F. Two replicates were run at each concentration. In these experiments, the product of Example 2 gave the following results:

| Concn., p.p.m. | Organism | Percent Spore Germination | | | $ED_{50}$,[1] p.p.m. |
|---|---|---|---|---|---|
| | | Rep. 1 | Rep. 2 | Ave. | |
| 100 | Fusarium roseum | 0 | 0 | 0 | 21 |
| 100 | Monilinia fructicola | 0 | 0 | 0 | 16 |
| 100 | Stemphylium sarcinaeforme | 0 | 0 | 0 | 32 |

[1] Dosage effective for 50% control.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell or wheat flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. Other pesticides as well as such substances as fertilizers, activators, adhesives, spreaders, and synergists can be added to these formulations if desired.

When used for the control of plant diseases, the compounds of this invention can be used as seed treatments, soil treatments, or plant treatments. Many of the disease-producing bacteria and the fungi that cause blights, spots, and rots are carried on or in seeds, roots, bulbs, tubers, corms, or other seed stock purchased by growers. These disease-producing organisms can be destroyed by dipping the seed or planting stock in liquid formulations of the compounds of this invention. Many plant pathogens are also soil-borne, and the application of the active compounds to the soil is one of the useful methods for control or eradication of the organisms, particularly in green houses, cold frames, hotbeds, and seedbeds. Both solid and liquid compositions of the compounds of this invention can be used in such soil treatments. Plant treatments by chemicals in the form of liquid or solid fungicidal compositions are made on growing crops or on crop residues.

When the compounds of this invention are used as nematocides, they are ordinarily used as soil treatments. Plants generally become infected by nematodes that move into them from the soil. The underground parts of plants, roots, tubers, and rhizomes are thus more apt to be infected than above-ground parts, but infection of stems, leaves, and flower parts is also fairly common.

The solid or liquid pesticidal compositions can be applied to the soil in any convenient manner, such as by conventional plow or disc methods or by such specialized methods as split-dosage applications, post-planting side-dress applications, and the like. The pesticidal compositions of this invention can be applied to growing plants by spraying, dusting, and the like.

The active compounds of this invention are applied in amounts sufficient to exert the desired pesticidal action. The amount of the active compound present in the pesticidal compositions as actually applied for preventing or controlling pest infestations varies with the type of application, the particular species which are to be controlled, the purpose for which the treatment is made, and the like. Generally, the solid or liquid compositions of this invention will contain from about 0.5% to about 90% of the active compounds.

I claim:
1. A compound of the formula

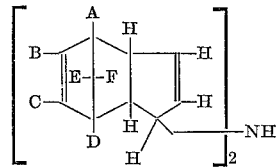

wherein A, B, C, D, E, and F are independently selected from the group consisting of hydrogen, chlorine, and bromine atoms, at least one of said A, B, C, D, E and F being selected from the group consisting of chlorine and bromine atoms.

2. Bis-(4,5,6,7,8,8-hexachloro-3a,4,7,7a-tetrahydro-4,7-methanoinden-1-yl)-amine.

3. Bis-(4,5,6,7-tetrachloro-3a,4,7,7a-tetrahydro-4,7-methanoinden-1-yl)-amine.

4. Bis-(4,5,6,7,8-pentachloro-3a,4,7,7a-tetrachloro-4,7-methanoinden-1-yl)-amine.

5. Bis-(4,5,6,7,8,8-hexabromo-3a,4,7,7a-tetrahydro-4,7-methanoinden-1-yl) amine.

6. Bis-(4,5,6,7-tetrabromo-3a,4,7,7a-tetrahydro-4,7-methanoinden-1-yl) amine.

References Cited in the file of this patent
UNITED STATES PATENTS

| | | |
|---|---|---|
| 2,528,655 | Herzfeld | Nov. 7, 1950 |
| 2,528,656 | Herzfeld | Nov. 7, 1950 |
| 2,635,979 | Lidov | Apr. 21, 1953 |
| 2,709,180 | Goldman | May 24, 1955 |
| 2,744,924 | Herzfeld | May 8, 1956 |
| 2,761,806 | Boyer | Sept. 4, 1956 |
| 2,844,506 | Jenkins | July 22, 1958 |
| 2,894,987 | Stein et al. | July 14, 1959 |
| 2,921,958 | Feichtinger | Jan. 19, 1960 |
| 2,972,631 | Bain et al. | Feb. 21, 1961 |
| 3,006,954 | Ramey et al. | Oct. 21, 1961 |

FOREIGN PATENTS

| | | |
|---|---|---|
| 618,432 | Great Britain | Feb. 22, 1947 |

UNITED STATES PATENT OFFICE
CERTIFICATE OF CORRECTION

Patent No. 3,154,579                          October 27, 1964

John F. Flanagan

It is hereby certified that error appears in the above numbered patent requiring correction and that the said Letters Patent should read as corrected below.

Column 3, line 15, for "-3a,4,7a-" read -- -3a,4,7,7a- --; column 5, lines 14 to 23, in the table, last column thereof, for "21" read -- 32 --.

Signed and sealed this 16th day of March 1965.

(SEAL)
Attest:

ERNEST W. SWIDER
Attesting Officer

EDWARD J. BRENNER
Commissioner of Patents